United States Patent
Hedman et al.

(10) Patent No.: US 10,009,837 B2
(45) Date of Patent: Jun. 26, 2018

(54) FIRST NETWORK NODE, SECOND NETWORK NODE, AND METHODS THEREIN, OF PROVIDING A LAST USED PUBLIC LAND MOBILE NETWORK IDENTIFIER

(71) Applicant: Telefonaktiebolaget L M Ericsson (publ), Stockholm (SE)

(72) Inventors: Peter Hedman, Helsingborg (SE); Thomas Johansson, Åby (SE); Magnus Karlsson, Lund (SE); Paul Schliwa-Bertling, Ljungsbro (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 74 days.

(21) Appl. No.: 14/897,497

(22) PCT Filed: May 20, 2014

(86) PCT No.: PCT/SE2014/050612
§ 371 (c)(1),
(2) Date: Dec. 10, 2015

(87) PCT Pub. No.: WO2014/200408
PCT Pub. Date: Dec. 18, 2014

(65) Prior Publication Data
US 2016/0142969 A1    May 19, 2016

Related U.S. Application Data

(60) Provisional application No. 61/834,936, filed on Jun. 14, 2013.

(51) Int. Cl.
*H04W 48/18* (2009.01)
*H04W 36/00* (2009.01)
*H04W 36/16* (2009.01)

(52) U.S. Cl.
CPC ....... *H04W 48/18* (2013.01); *H04W 36/0022* (2013.01); *H04W 36/0066* (2013.01); *H04W 36/165* (2013.01)

(58) Field of Classification Search
CPC ............... H04W 48/18; H04W 36/165; H04W 36/0066; H04W 36/0022
See application file for complete search history.

(56) References Cited

U.S. PATENT DOCUMENTS

| | | | |
|---|---|---|---|
| 2006/0073831 A1* | 4/2006 | Guyot | H04W 36/14 455/443 |
| 2006/0166694 A1* | 7/2006 | Jeong | H04W 48/16 455/525 |

(Continued)

OTHER PUBLICATIONS

SA WG2 Meeting #97; Busan, South Korea; Change Request; revision of S2-132069/S2-131674; Title: How CSFB UE return back to the former LTE PLMN; Source to TSG: S2; Source to WG: Huawei, Hisilicon, Yota, Alcatel-Lucent, China Mobile, N3C, CATT, ZTE (S2-132184), May 27-31, 2013.

(Continued)

*Primary Examiner* — Kwang B Yao
*Assistant Examiner* — Moo Ryong Jeong
(74) *Attorney, Agent, or Firm* — Sage Patent Group

(57) ABSTRACT

A method performed by a first network node of providing a last used PLMN ID in LTE to a second network node, the first network node and the second network node operating in a wireless communications network. The method comprises providing the last used PLMN ID in LTE of a wireless device in the wireless communications network, to the second network node, as soon as a Circuit Switched, CS, call due to a CSFB procedure has been setup. The providing of the PLMN ID is performed by one of: adding information about the last used PLMN ID in LTE to an existing message from the first network node to the second network node, and (Continued)

```
                    ( Start )
                        │
                        ▼
┌─────────────────────────────────────────────────────────────────────┐
│ 301. Provide the last used PLMN ID to the second network node as    │
│ soon as the CS call due to a CSFB procedure has been setup by one of:│
│                                                                      │
│   ┌──────────────────────────────────────┐  ┌──────────────────────┐│
│   │ adding information to the existing   │  │ defining the new     ││
│   │ message                              │  │ message              ││
│   └──────────────────────────────────────┘  └──────────────────────┘│
└─────────────────────────────────────────────────────────────────────┘
                        │
                        ▼
                    ( End )
``` defining a new message from the first network node to the second network node. The new message comprises the last used PLMN ID in LTE.

12 Claims, 6 Drawing Sheets

(56) References Cited

U.S. PATENT DOCUMENTS

| | | | |
|---|---|---|---|
| 2011/0222509 A1 | 9/2011 | Lee | |
| 2014/0087723 A1* | 3/2014 | Cili | H04W 24/08 455/426.1 |
| 2014/0287726 A1* | 9/2014 | Jang | H04W 36/0083 455/411 |
| 2015/0296420 A1* | 10/2015 | Drevon | H04W 48/18 455/436 |
| 2015/0312809 A1* | 10/2015 | Shu | H04W 36/0022 370/331 |

OTHER PUBLICATIONS

SA WG2 Meeting #97; Busan, South Korea; Change Request; revision of S2-132070; Title: CN signalling for allowing UE return to former LTE PLMN after CSFB; Source to WG: Alcatel-Lucent, Huawei, Hisilicon; Source to TSG: SA WG2 (S2-132185), May 27-31, 2013.

SA WG2 Meeting #S2-99; Xiamen, P.R. China; Title: LS on introduction of support for last used E-UTRAN PLMN ID in GERAN; Source: GERAN2 (S2-133178), Sep. 23-27, 2013.

3GPP TSG-SA2 Meeting #99; Xiamen, P.R. China; Change Request; Title: Earlier provision of the former last used LTE PLMN ID; Source to WG: Ericsson; Source to TSG: SA WG2 (S2-133561), Sep. 23-27, 2013.

PCT International Search Report for International application No. PCT/SE2014/050612, dated Oct. 20, 2014.

PCT Written Opinion of the International Searching Authority for International application No. PCT/SE2014/050612, dated Oct. 20, 2014.

* cited by examiner

FIRST NETWORK NODE, SECOND NETWORK NODE, AND METHODS THEREIN, OF PROVIDING A LAST USED PUBLIC LAND MOBILE NETWORK IDENTIFIER

PRIORITY

This nonprovisional application is a U.S. National Stage Filing under 35 U.S.C. § 371 of International Patent Application Serial No. PCT/SE2014/050612 filed May 20, 2014, and entitled "First Network Node, Second Network Node, And Methods Therein, Of Providing A Last Used Public Land Mobile Network Identifier" which claims priority to U.S. Provisional Patent Application No. 61/834,936 filed Jun. 14, 2013, both of which are hereby incorporated by reference in their entirety.

TECHNICAL FIELD

The present disclosure relates generally to a first network node, and methods therein of providing a last used Public Land Mobile Network Identifier (PLMN ID) in Long Term Evolution (LTE) to a second network node. The present disclosure also relates generally to the second network node and methods therein of updating handover procedures to a third network node with the last used PLMN ID in LTE. The present disclosure relates as well to computer programs and computer-readable storage mediums, having stored thereon the computer programs to carry out the aforementioned methods. In particular, embodiments herein relate to LTE frequency provisioning prior to fast return.

BACKGROUND

Communication devices such as wireless devices are also known as e.g., terminals, User Equipments (UE), mobile terminals, wireless terminals and/or mobile stations. Any reference herein to a UE may be understood to refer to a wireless device, or vice versa. Wireless devices are enabled to communicate wirelessly in a cellular communications network or wireless communication system, sometimes also referred to as a wireless communications network, cellular radio system or cellular networks. The communication may be performed e.g. between two wireless devices, between a wireless device and a regular telephone and/or between a wireless device and a server via a Radio Access Network (RAN) and possibly one or more core networks, comprised within the cellular communications network.

Wireless devices may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by an access node such as a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g., macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE controlled by the radio base station.

In LTE, voice services are not necessarily supported, it depends on network configuration. Therefore, in LTE, which uses the Evolved Universal Terrestrial RAN (E-UTRAN), if a wireless device needs to make or receive a call, and if voice services are not supported in LTE, a communication with the wireless device is transferred from the LTE network to a $2^{nd}$ Generation (2G), through e.g., a Global System for Mobile communications (GSM)/Enhanced Data rates for GSM Evolution (EDGE) RAN (GERAN)) or a 3G (through e.g., a Universal Terrestrial RAN (UTRAN), network. This 3GPP specified procedure is known in as a Circuit Switched Fall Back (CSFB), since the communication returns to LTE after the Circuit Switched (CS) call. Once the call is finished, the UE may be transferred back to the LTE network when the radio resources are released. If an LTE cell providing coverage cannot be found when returning a communication with the UE to LTE from a 2G or 3G network, service outage time increases.

SUMMARY

It is an object of embodiments herein to improve the performance in a wireless communications network by increasing the chance to select cell frequencies that a wireless device may use when directed back to LTE after a call release.

According to a first aspect of embodiments herein, the object is achieved by a method performed by a first network node. The method is of providing a last used PLMN ID in LTE to a second network node. The first network node and the second network node operate in a wireless communications network. The first network node provides the last used PLMN ID in LTE of a wireless device in the wireless communications network, to the second network node. This is performed as soon as a Circuit Switched, CS, call due to a CSFB procedure has been setup. The providing of the PLMN ID is performed by one of: a) adding information about the last used PLMN ID in LTE to an existing message from the first network node to the second network node, and b) defining a new message from the first network node to the second network node. The new message comprises the last used PLMN ID in LTE.

According to a second aspect of embodiments herein, the object is achieved by a method performed by the second network node. The method is of updating handover procedures to a third network node with the last used PLMN ID in LTE. The second network node, and the third network node operate in the wireless communications network. The second network node updates the handover procedures with the last used PLMN ID in LTE of the wireless device in the wireless communications network. The last used PLMN ID in LTE has been provided by the first network node to the second network node as soon as the CS call due to the CSFB procedure has been setup. The first network node operates in the wireless communications network. The providing of the PLMN ID has been performed by the first network node by one of: a) adding information about the last used PLMN ID in LTE to the existing message from the first network node to the second network node, and b) defining the new message from the first network node to the second network node. The new message comprises the last used PLMN ID in LTE.

According to a third aspect of embodiments herein, the object is achieved by the first network node for providing the last used PLMN ID in LTE to the second network node. The first network node and the second network node are configured to operate in the wireless communications network. The first network node is further configured to: provide the last used PLMN ID in LTE of the wireless device in the wireless communications network, to the second network node. This is configured to be performed as soon as the CS call due to the CSFB procedure has been setup. To provide the PLMN ID is configured to be performed by one of: a) adding information about the last used PLMN ID in LTE to the existing message from the first network node to the second network node, and b) defining the new message from the first network node to the second network node. The new message comprises the last used PLMN ID in LTE.

According to a fourth aspect of embodiments herein, the object is achieved by the second network node for updating handover procedures to the third network node with the last used PLMN ID in LTE. The second network node and the third network node are configured to operate in the wireless communications network. The second network node is further configured to update the handover procedures with the last used PLMN ID in LTE of the wireless device. The wireless device is configured to operate in the wireless communications network. The last used PLMN ID in LTE has been provided by the first network node to the second network node as soon as the CS call due to the CSFB procedure has been setup. The first network node is configured to operate in the wireless communications network. The providing of the PLMN ID is configured to have been performed by the first network node by one of: a) adding information about the last used PLMN ID in LTE to the existing message from the first network node to the second network node, and b) defining the new message from the first network node to the second network node, the new message comprising the last used PLMN ID in LTE.

According to a fifth aspect of embodiments herein, the object is achieved by a computer program, comprising instructions which, when executed on at least one processor, cause the at least one processor to carry out the method performed by the first network node.

According to a sixth aspect of embodiments herein, the object is achieved by a computer-readable storage medium, having stored thereon the computer program, comprising instructions which, when executed on at least one processor, cause the at least one processor to carry out the method performed by the first network node.

According to a seventh aspect of embodiments herein, the object is achieved by a computer program, comprising instructions which, when executed on at least one processor, cause the at least one processor to carry out the method performed by the second network node.

According to an eighth aspect of embodiments herein, the object is achieved by a computer-readable storage medium, having stored thereon the computer program, comprising instructions which, when executed on at least one processor, cause the at least one processor to carry out the method performed by the second network node.

By the first network node providing the last used PLMN ID in LTE to the second network node, as soon as the CS call due to the CSFB procedure has been setup, the second network node is able to request the wireless device to perform measurements and provide the results of the measurements on the E-UTRAN frequencies associated with the latest used PLMN ID in E-UTRAN. This is possible since the first network node provides the last used PLMN ID in LTE before the CS call has been released. The second network node is also able to request the wireless device to measure on frequencies belonging to an allowed PLMN. Hence, the second network node may be aware of whether or not there is actually any radio coverage provided by frequencies in allowed PLMNs. Using these frequencies in the re-direct procedure of the CS call at CS call release may then be reliably conducted to frequencies that are providing radio coverage, i.e., to allowed radio coverage. Thus, this may result in a successful return of the wireless device to an LTE cell.

A further advantage of the methods herein is that the last used PLMN ID in LTE may be propagated to other network nodes, such as the third network node, at potential subsequent inter network node mobility.

This results in a more efficient usage of radio resources, as needless measurements are avoided, and an improved experience by a user of the wireless device, since the probability of a service outage time is largely decreased.

BRIEF DESCRIPTION OF THE DRAWINGS

Examples of embodiments herein are described in more detail with reference to attached drawings in which.

DETAILED DESCRIPTION

Terminologies

Figure 1:
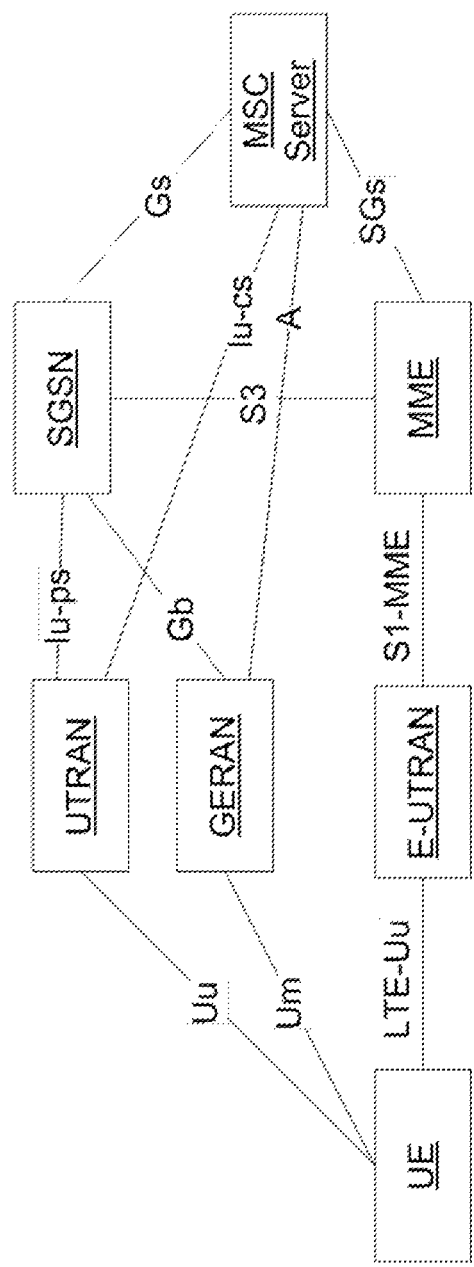
FIG. 1 is a schematic diagram illustrating an Evolved Packet System (EPS) architecture for CS fallback for voice and SMS.

The following commonly terminologies are used in the embodiments and are elaborated below:

Radio network node: In some embodiments the non-limiting term radio network node is more commonly used and it refers to any type of network node serving UE and/or connected to other network node or network element or any radio node from where UE receives signal. Examples of radio network nodes are Node B, base station (BS), multi-standard radio (MSR) radio node such as MSR BS, eNode B, network controller, radio network controller (RNC), base station controller, relay, donor node controlling relay, base transceiver station (BTS), access point (AP), transmission points, transmission nodes, RRU, RRH, nodes in distributed antenna system (DAS) etc.

Network node: In some embodiments a more general term "network node" is used and it can correspond to any type of radio network node or any network node, which communicates with at least a radio network node. Examples of network node are any radio network node stated above, core network node, e.g. MSC, MME, Operation and Maintenance (O&M), Operations Support Systems (OSS), Self-Optimizing/Organizing Network (SON), positioning node, e.g., Evolved Serving Mobile Location Centre (E-SMLC), etc. . . . .

User equipment: In some embodiments the non-limiting term user equipment (UE) is used and it refers to any type of wireless device communicating with a radio network node in a cellular or mobile communication system. Examples of UE are target device, device to device UE, machine type UE or UE capable of machine to machine communication, Personal Digital Assistant (PDA), iPad, Tablet, mobile terminals, smart phone, Laptop Embedded Equipped (LEE), Laptop Mounted Equipment (LME), USB dongles etc. . . . . .

The embodiments herein also apply to the multi-point carrier aggregation systems.

Note that although terminology from 3GPP LTE has been used in this disclosure to exemplify the embodiments herein, this should not be seen as limiting the scope of the embodiments herein to only the aforementioned system. Other wireless systems, including WCDMA, WiMax, UMB and GSM, may also benefit from exploiting the ideas covered within this disclosure.

Also note that terminology such as eNodeB and UE should be considering non-limiting and does in particular not imply a certain hierarchical relation between the two; in general "eNodeB" could be considered as device 1 and "UE" device 2, and these two devices communicate with each other over some radio channel. Herein, we also focus on wireless transmissions in the downlink, but the embodiments herein are equally applicable in the uplink.

In this section, the embodiments herein will be illustrated in more detail by a number of exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

As part of the development of embodiments herein, one or more problems that may be associated with use of at least some of the prior art solutions, and that may addressed by embodiments herein, will first be identified and discussed.

Before a RAN serving a CS call may redirect the UE engaged in the call to the LTE network, it may need to know which LTE frequency, or cell, may provide good quality communication link with the UE. This is of the LTE frequencies or cells the UE is allowed to establish a communication with, given the contracted services by the UE from an operator of the LTE network. Thus, the RAN may request that the UE performs a number of measurements on certain LTE frequencies or cells to assess the quality of the radio link the UE may have with one or more network nodes providing radio coverage, e.g., base stations.

Currently there is ongoing work, see Change Request (CR) [S2-132184] and CR [S2-132185], to specify means at calls initiated by a CSFB procedure, see 3GPP Technical Specification (TS) 23.272, to provision the RAN serving the CS call by the MSC serving that CS call with the "last used Public Land Mobile Network Identifier (PLMN ID) in LTE", i.e., the PLMN ID that the UE was last time registered to while in LTE. The PLMN ID comprises a Mobile Country Code and a Mobile Network Code and uniquely identifies an operator. By returning a UE to the last visited PLMN, it is ensured that the UE is directed to an operator that can provide service to the user, such as the UE. The RAN may take that PLMN ID into account for selecting the E-UTRAN frequencies when re-directing the UE back to LTE at CS call release. The current assumption is that this information shall be provided to the RAN at the CS call release.

However, providing the "last used PLMN ID in LTE" to the RAN at the CS call release means that the RAN at this late stage cannot request the UE to perform measurements and provide the measurements results on the E-UTRAN frequencies associated with the latest used PLMN ID in E-UTRAN. The RAN may have requested the UE to measure on frequencies belonging to several PLMNs. However, the number of cells the MS, i.e., the UE or wireless device, can measure and report is limited by the processing capacity in the UE, and the minimum number of frequencies and cells that a UE must be able to monitor is specified in 3GPP. Therefore, there is no guarantee that the UE has measured on frequencies in an allowed PLMN. Hence, RAN is unaware of whether or not there is actually any radio coverage provided by frequencies in allowed PLMNs. Thus using these frequencies in the re-direct procedure might result in sending the UE into a non-allowed radio coverage which thus will result in a service outage time for the UE, until it has found a suitable cell.

Another approach that is used by existing methods is based on a feature of the International Mobile Subscriber Identity (IMSI). With IMSI handover features, it is possible to configure an IMSI series to allowed frequencies in the Base Station Controller (BSC) in order to measure on proper frequencies.

The drawback with the IMSI handover feature is that the number of frequencies to measure is static and a large number of frequencies will have to be measured. This may turn out to be unnecessary if some frequencies in the list are not at an optimal radio range.

The approach proposed by some embodiments herein to address this problem is thus to assist the RAN with the information for the last used PLMN ID in LTE as soon as the CS call due to CSFB procedure has been setup, and to ensure that this information is propagated to other RAN nodes at potential subsequent inter RAN mobility. In addition, other allowed PLMN IDs should be possible to provide in case there are other PLMNs that are preferred over the last used PLMN.

Embodiments of methods herein, as for example, described above in a particular example, will now be further described. Any of the details already provided apply to the following description.

FIG. 1 is a schematic diagram illustrating an example of an Evolved Packet System (EPS) architecture for CSFB for voice and Short Message Service (SMS), in which embodiments herein may be implemented. A wireless device, such as a UE, may have connections to a E-UTRAN, a GERAN and a UTRAN network through respective interfaces, i.e., LTE-Us, Um and Uu, respectively. Each of these networks is connected directly or indirectly to a Mobility Management Entity (MME), Serving General Packet Radio Service (GPRS) Support Node (SGSN) and a Mobile Switching Centre (MSC) Server, through a respective interface, as shown. This architecture allows for a communication with the UE to be switched from LTE to a 2G or 3G network, and back.

Figure 2:
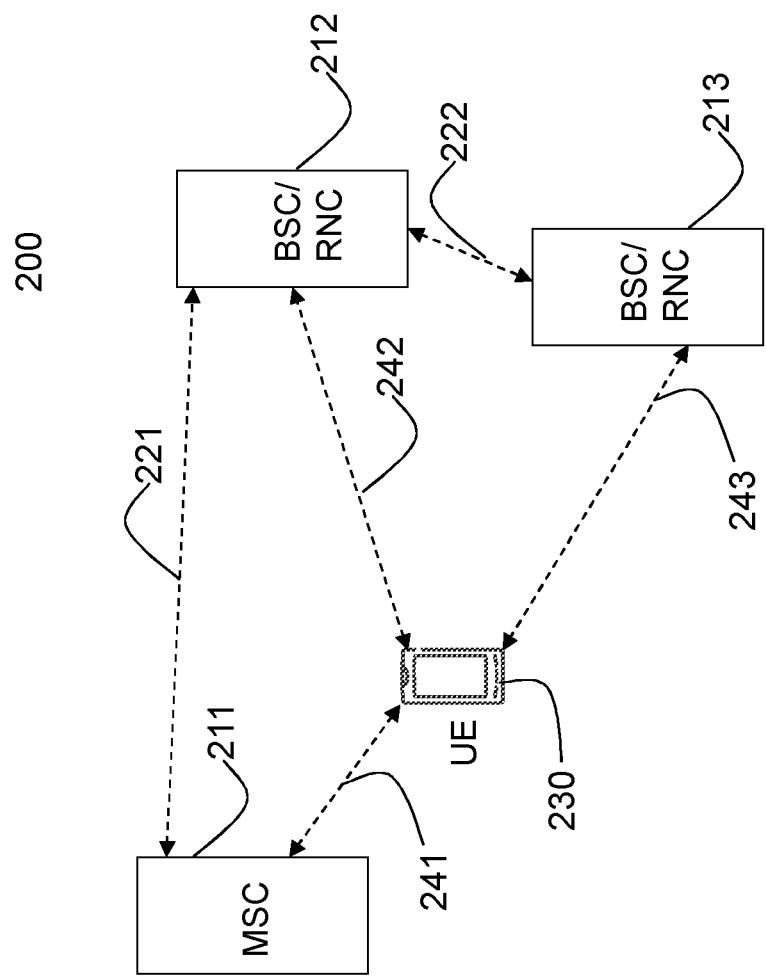
FIG. 2 is a schematic diagram illustrating embodiments of a wireless communications network.

FIG. 2 depicts an example of a wireless communications network 200 in which embodiments herein may be implemented.

The wireless communications network 200 may comprise a wireless communication network such as an LTE, Wideband Code Division Multiple Access (WCDMA), GSM network, any 3GPP cellular network, Worldwide Interoperability for Microwave Access (WiMAX), or any cellular network or system. Thus, in some particular embodiments, the wireless communications network 200 may, for example, have an architecture such as that represented in FIG. 1, and it may therefore comprise a UTRAN, a GERAN and a E-UTRAN.

The wireless communications network 200 comprises a plurality of network nodes whereof three, a first network node 211, a second network node 212, and a third network node 213 are depicted in FIG. 2. In a particular embodiment described herein, the first network node 211 may be an MSC such as that depicted in FIG. 1. The second network node 212 may be a RAN network node, such as a Base Station Controller (BSC) or an RNC, and the third network node 213 may be another RAN network node, such as another BSC or another RNC. In some embodiments, the second network node 212 and the third network node 213 may each be a transmission point such as a radio base station, for example a BTS, a Node B, a Home Node B, or a eNB, a eNodeB, or a Home eNode B with voice support, or any other network node capable to serve a user equipment or a machine type communication device in the wireless communications network 200 with voice support. In some particular embodiments, the second network node 212 and the third network node 213 may be a stationary relay node or a mobile relay node.

The wireless communications network 200 covers a geographical area which is divided into cell areas, wherein each cell area is served by a radio network node, although, one radio network node may serve one or several cells. Thus, the second network node 212 may serve a first cell, and the third network node 213 may serve a second cell. The cells are not depicted in FIG. 2 to simplify the figure. Each of the second network node 212 and the third network node 213 may be of different classes or types, such as, e.g., BTS or pico base station, based on transmission power and thereby also cell size. Typically, the wireless communications network 200 may comprise more cells similar to the first cell and the second cell, served by their respective network node. Each of the second network node 212 and the third network node 213 may support one or several communication technologies, and its name may depend on the technology and terminology used. In 3GPP, the second network node 212 and the third network node 213, may be directly connected to one or more core networks, as depicted in the example of FIG. 1. The communication circuit may comprise a receiving circuit, a sending circuit, and an updating circuit.

The first network node 211, the second network node 212 and the third network node 213 may be interconnected in a similar fashion as that shown in FIG. 1. Hence, the first network node 211 may be connected to the second network node 212 through a first link 221. The second network node 212 may be connected to the third network node 213 through a second link 222.

A wireless device 230, also referred to as a user equipment or UE, is located in the wireless communication network 200. The wireless device may e.g. be a user equipment, a mobile terminal or a wireless terminal, a mobile phone, a mobile station, mobile telephone, and/or cellular telephone, a computer such as e.g. a laptop, a Personal Digital Assistants (PDAs) or a tablet computer, sometimes referred to as a surf plate, with wireless capability, or any other radio network unit/s capable to communicate over a radio link in a wireless communications network, e.g., devices equipped with a wireless interface, such as a printer or a file storage device. Please note the term user equipment used in this document also covers other wireless devices such as Machine to machine (M2M) devices, even though they do not have any user. Each of the devices is wireless, i.e., it is enabled to communicate, e.g., voice and/or data, wirelessly in the wireless communications network 200. The communication may be performed e.g., between two devices, between a device and a regular telephone and/or between a device and another entity, such as a server or any other radio network unit capable of communicating over a radio link in the wireless communications network 200. The communication may be performed e.g., via a RAN and possibly the one or more core networks comprised within the wireless communications network 200.

The wireless device 230 is located within the first cell. The wireless device 230 is configured to communicate within the wireless communications system 200 in a similar fashion as that shown in FIG. 1. Hence, the wireless device 230 may be connected to: the first network node 211 through a third link 241, the second network node 212 through a fourth link 242, and the third network node 213 through a fifth link 243.

Embodiments of a method performed by the first network node 211 of providing a last used PLMN ID, in LTE, to the second network node 212 will now be described with reference to the schematic diagram depicted in FIG. 3. As stated earlier, the first network node 211 and the second network node 212 operate in the wireless communications network 200. The method comprises the following action.

Action 301

The wireless device 230 may have an ongoing, e.g., data, communication with an LTE network node, e.g., an eNB, in the in a E-UTRAN in the wireless communications network 200. The wireless device 230 may have been registered in a PLMN with a PLMN ID while connected to the LTE network comprised in the wireless communications network 200. The wireless device 230 may then receive a voice call, or it may need to make a call. The communication of the wireless device 230 with the eNB is then transferred from the E-UTRAN to the second network node 212 in e.g., a GERAN or a UTRAN, which may provide voice services, via the architecture depicted in FIG. 1. The CS call is then set up and ongoing. According to embodiments herein, the last used PLMN ID may be provided as soon as the CS call has been setup. This may be achieved by the following:

According to embodiment 1, adding the information about the "last used PLMN ID in LTE" and a list of higher priority PLMNs to an existing message. The existing message is sent from the first network node 211 such as, e.g., an MSC to the second network node 212 such as e.g., a network node in a RAN comprised in the wireless communications network 200 which, e.g., provides voice services. In the case of GERAN, for example, this may be realized by adding this information to the 48.008 COMMON ID message. In the case of UTRAN, it may be realized by adding this information to the 25.413 COMMON ID message, to the UE SPECIFIC INFORMATION INDICATION message, RAB ASSIGNMENT REQUEST message, or any other existing message possible to be sent before the release of the connection. This may be performed by communication circuits within the respective first network node 211 and second network nodes 212, as explained later.

According to embodiment 2, defining a new message on an A and Iu interface. The new message that may be sent from the first network node 211, such as, e.g., an MSC, to the second network node 212, such as, e.g., a RAN node comprised in the wireless communications network 200 which network node, e.g., provides voice services. The new message may be sent after a successful CS call setup due to CSFB, which contains the last used PLMN ID in LTE and higher priority PLMNs. This may be performed by the communication circuits in the respective first network node 211 and second network node 212.

According to embodiment 3, to ensure that the information is available to the serving RAN node, e.g., the second network node 212, also at inter-RAN mobility, the first network node 211 such as, e.g., the MSC, may add the information to the 48.008 HANDOVER REQUEST, or, for UTRAN, to the 25.413 RELOCATION REQUEST message. This may be performed by an updating circuit within the first network node 211, as explained later.

Figure 3:
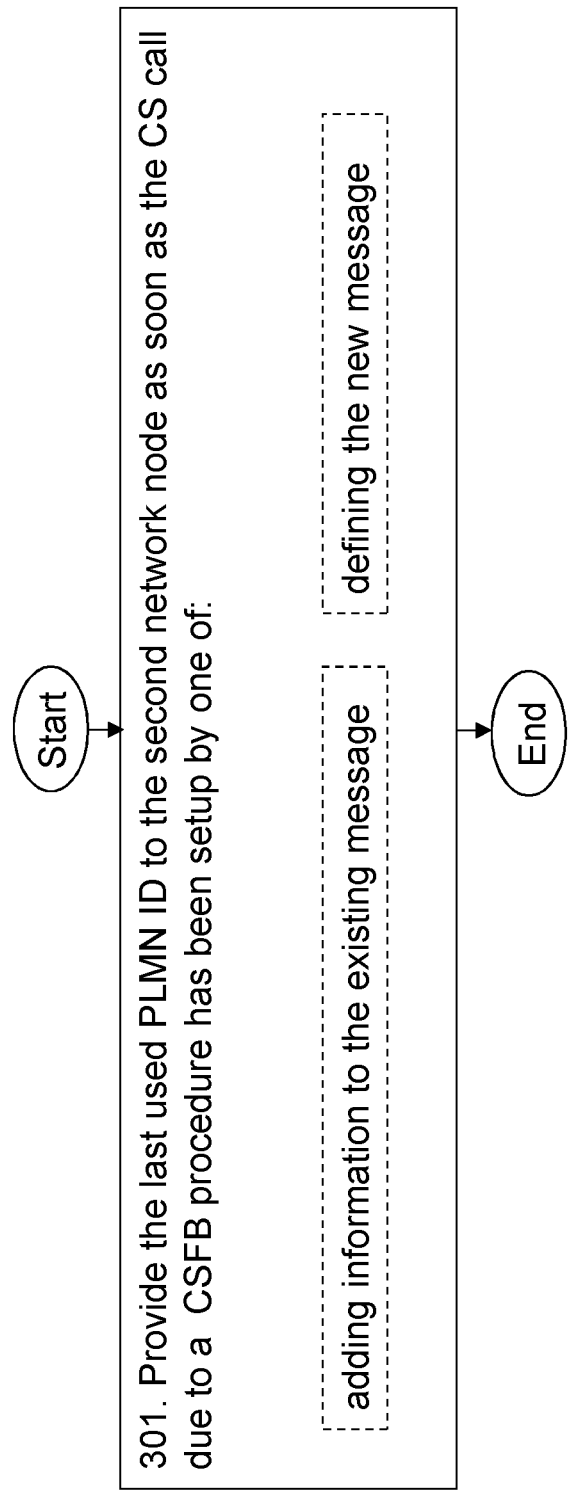
FIG. 3 is a schematic diagram illustrating embodiments of a method in a first network node, according to embodiments herein.

Thus, in this action, as depicted in FIG. 3, the first network node 211 provides the last used PLMN ID in LTE of the wireless device 230 in the wireless communications network 200, to the second network node 212, as soon as a CS call due to a CSFB procedure has been setup. The providing of the PLMN ID is performed by one of: a) adding information about the last used PLMN ID in LTE to an existing message from the first network node 211 to the second network node 212, and b) defining a new message from the first network node 211 to the second network node 212, the new message comprising the last used PLMN ID in LTE.

In some embodiments, the adding information further comprises adding a list of higher priority PLMNs to the existing message, and the new message further comprises the list of higher priority PLMNs.

In some embodiments, the existing message is one out of: a COMMON ID message, a UE SPECIFIC INFORMATION INDICATION message, and a Radio Access Bearer, RAB, ASSIGNMENT REQUEST message.

In some embodiments, the last used PLMN ID is available to the second network node 212 at inter radio access network mobility from the second network node 212 to the third network node 213, and it is added to a handover preparation phase by updating handover procedures from the second network node 212 to the third network node 213.

In some embodiments, the last used PLMN ID is available to the second network node 212 at inter radio access network mobility from the second network node 212 to the third network node 213. In some of these embodiments, the providing the last used PLMN ID in LTE may be performed by adding information to an existing message. The existing message may comprise one out of: a HANDOVER REQUEST message and RELOCATION REQUEST message.

Figure 4:
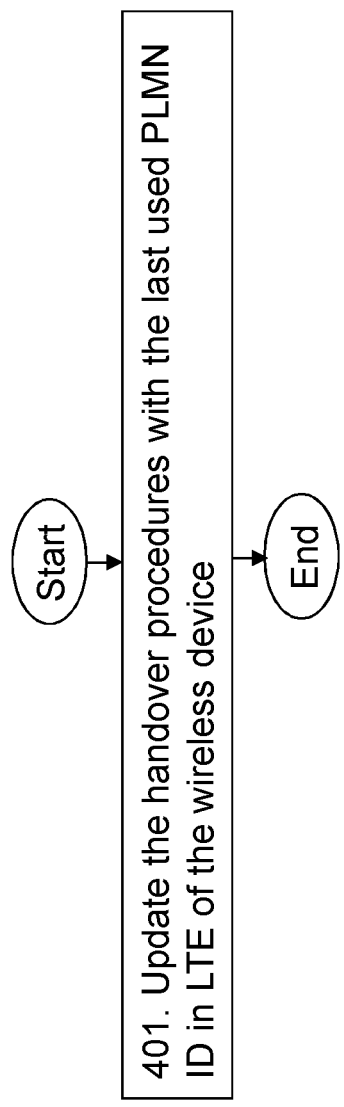
FIG. 4 is a schematic diagram illustrating embodiments of a method in a second network node, according to embodiments herein.

Embodiments of a method performed by the second network node 212 of updating handover procedures to the third network node 213 with the last used PLMN ID in LTE will now be described with reference to the schematic diagram depicted in FIG. 4. As stated earlier, the second network node 212, and the third network node 213 operate in the wireless communications network 200.

The method comprises the following actions.

Action 401

In the same context of the CSFB procedure outlined above in action 301, during the CS call, the wireless device 230 may move from the radio coverage provided by the second network node 212, into the area of radio coverage provided by the third network node 213. The second network node 212, may then handover the CS call to the third network node 213 to continue to provide a good quality of radio communication to the wireless device 230. To ensure that the information regarding the last used PLMN ID in LTE of the wireless device 230 is available to the serving RAN node also at inter-RAN or intra-RAN mobility, embodiments herein provide to update the handover procedures with the "last used PLMN ID in LTE" added to the handover preparation phase. This may be performed as an alternative approach to the embodiment 3 described earlier in relation to action 301.

For example, in GERAN, embodiments herein may add that information to e.g., a container within a message from an network node in the source base station system, such as an "Old BSS", for example, from the second network node 212, to a network node in a target base station system, such as a "new BSS", for example the third network node 213. That is, add the information to the "Old BSS to new BSS transparent information" information element, or to the "Old BSS to new BSS information" information element. The information may also be added to e.g., a container within a message from a source network node, e.g., in GERAN. That is, the information may be added to the second network node 212, such as a BSC to a target network node, such as the third network node 213, such as a "target RNC". That is, add the information to the "Source RNC to target RNC transparent information" when at inter RAT handover contained in 48.008 HANDOVER REQUIRED message. In the case of UTRAN, it could be added to the 25.413 Source RNC to Target RNC Transparent Container IE. Other examples, intra-RAN and inter-RAN, are provided further down below. The source network node, i.e., the second network node 212, or the target network node, i.e., the third network node 213, may be an RNC or a base station controller. This may be performed by an updating circuit within the RNC or, e.g., a BSC in the BSS, i.e., the second network node 212, as described later, and/or the third network node 213.

Thus, in this action, the second network node 212 updates the handover procedures with the last used PLMN ID in LTE of the wireless device 230 in the wireless communications network 200. The last used PLMN ID in LTE having been provided by the first network node 211 to the second network node 212 as soon as the CS call due to the CSFB procedure has been setup. The first network node 211 operates in the wireless communications network 200. The providing of the PLMN ID has been performed by the first network node 211 by one of: a) adding information about the last used PLMN ID in LTE to an existing message from the first network node 211 to the second network node 212, and b) defining a new message from the first network node 211 to the second network node 212, the new message comprising the last used PLMN ID in LTE.

In some embodiments, the updating comprises that the last used PLMN ID is added to a HANDOVER REQUIRED message, wherein the information is added to one out of: "Old BSS to new BSS transparent information" and "Source Radio Network Controller, RNC, to target RNC transparent information".

In further particular examples of embodiments herein, the last used PLMN ID may be added to different containers in messages from the second network node 212 to the third network node 213, depending on the particular RAN each of the second network node 212 and the third network node 213 belong to. The following is a list of these containers, e.g., Handover Required, Handover Request, and the corresponding specific information elements, in quotes, e.g., "Old BSS to new BSS transparent information". In the list, the RAN before the underlined "to" indicates the RAN of the second network node 212 and the RAN after the "to" indicates the RAN of the third network node 213. Some specific nodes for each of these network nodes are also mentioned in these specific examples, although other nodes may be applicable:

GSM to GSM: Handover Required "Old BSS to new BSS information" from source BSC and Handover Request "Old BSS to new BSS information" in target BSC.

GSM to UTRAN: Handover Required "Source RNC to target RNC transparent information" from source BSC node and Relocation Request "Source To Target Transparent Container" in target RNC.

UTRAN to GSM: Relocation Required "Old BSS to new BSS transparent information" from source RNC and Handover Request "Old BSS to new BSS transparent information" in target BSC.

UTRAN to UTRAN: RELOCATION REQUIRED "Source To Target Container" from source BSC node and Relocation Request "Source To Target Container" in target RNC.

An advantage of embodiments herein may be that a re-direction to appropriate PLMN in E-UTRAN at CS call release will be reliably conducted to frequencies that are providing radio coverage.

Also, if E-UTRAN frequencies from the last used PLMN is measured only, the number of frequencies to measure can be kept lower, e.g., than those that may have to be measured according to the IMSI handover feature discussed earlier in relation to prior art.

A yet further advantage of the methods herein is that other allowed PLMN IDs may be provided in case there are other PLMNs that are preferred over the last used PLMN.

To perform the method action in the first network node 211 described above in relation to FIG. 3 for providing the last used PLMN ID in LTE to the second network node 212, the first network node 211 may comprise the following arrangement depicted in FIG. 5, and as described below. As mentioned above, the first network node 211 and the second network node 212 are configured to operate in the wireless communications network 200. The detailed description of some of the following corresponds to the same references provided above, in relation to the action described for the first network node 211, and will thus not be repeated here.

The first network node 211 is further configured to, e.g., by means of a communication circuit 501 configured to, provide the last used PLMN ID in LTE of the wireless device 230 in the wireless communications network 200, to the second network node 212, as soon as the CS call due to the CSFB procedure has been setup. To provide the PLMN ID is configured to be performed by one of: a) adding information about the last used PLMN ID in LTE to an existing message from the first network node 211 to the second network node 212, and b) defining a new message from the first network node 211 to the second network node 212, the new message comprising the last used PLMN ID in LTE.

The communication circuit 501, which may be also referred to a communication module 501 may be a processor 502 of the first network node 211.

In some embodiments, the adding information further comprises adding the list of higher priority PLMNs to the existing message, and the new message further comprises the list of higher priority PLMNs.

This may also be implemented by the communication circuit 501.

In some embodiments, the existing message is one out of: the COMMON ID message, the UE SPECIFIC INFORMATION INDICATION message, and the RAB ASSIGNMENT REQUEST message.

In some embodiments, the last used PLMN ID is available to the second network node 212 at inter radio access network mobility from the second network node 212 to the third network node 213, and it is added to the handover preparation phase by updating handover procedures from the second network node 212 to the third network node 213.

In some embodiments, the last used PLMN ID is available to the second network node 212 at inter radio access network mobility from the second network node 212 to the third network node 213, wherein the providing 301 the last used PLMN ID in LTE is performed by adding information to the existing message, and the existing message comprises one out of: the HANDOVER REQUEST message and the RELOCATION REQUEST message.

Figure 5:
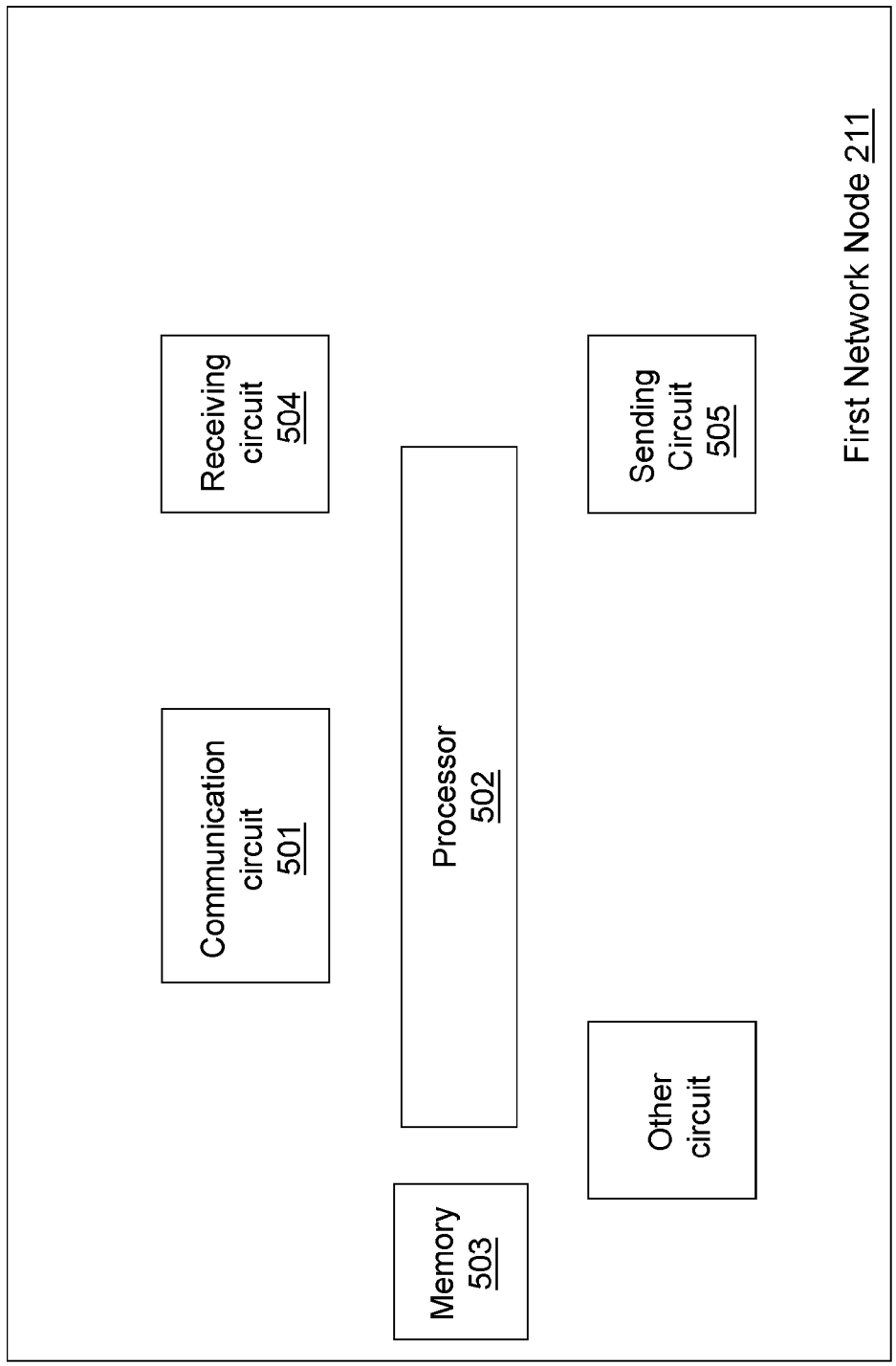
FIG. 5 is a schematic block diagram illustrating embodiments of the first network node.

The embodiments herein for providing a last used PLMN ID in LTE to the second network node 212 may be implemented through one or more processors, such as the processor 502 in the first network node 211 depicted in FIG. 5, together with computer program code for performing the functions and actions of the embodiments herein. The program code mentioned above may also be provided as a computer program product, for instance in the form of a data carrier carrying computer program code for performing the embodiments herein when being loaded into the in the first network node 211. One such carrier may be in the form of a CD ROM disc. It is however feasible with other data carriers such as a memory stick. The computer program code may furthermore be provided as pure program code on a server and downloaded to the first network node 211. As indicated above, the processor 502 may comprise one or more circuits, which may also be referred to as one or more modules in some embodiments, each configured to perform the actions carried out by the first network node 211, as described above in reference to FIG. 3, e.g., the communication circuit 501, etc. . . . . . Hence, in some embodiments, the communication circuit 501 described above may be implemented as one or more applications running on one or more processors such as the processor 502. That is, the methods according to the embodiments described herein for the first network node 211 are respectively implemented by means of a computer program product, comprising instructions, i.e., software code portions, which, when executed on at least one processor, cause the at least one processor to carry out the actions described herein, as performed by the first network node 211. The computer program product may be stored on a computer-readable storage medium. The computer-readable storage medium, having stored thereon the computer program, may comprise instructions which, when executed on at least one processor, cause the at least one processor to carry out the actions described herein, as performed by the first network node 211. In some embodiments, the computer-readable storage medium may be a non-transitory computer-readable storage medium, such as a CD ROM disc, or a memory stick. In other embodiments, the computer program product may be stored on a carrier containing the computer program of the previous claim, wherein the carrier is one of an electronic signal, optical signal, radio signal, or the computer-readable storage medium, as described above.

The first network node 211 may further comprise a memory 503 comprising one or more memory units. The memory 503 may be arranged to be used to store obtained information, such as the information received by the processor 502, store data configurations, schedulings, and applications etc. to perform the methods herein when being executed in the first network node 211. Memory 503 may be in communication with the processor 502. Any of the other information processed by the processor 502 may also be stored in the memory 503.

In some embodiments, information e.g., from the wireless device 230, and/or the second network node 212, and/or the third network node 213, may be received through a receiving circuit 504. The receiving circuit 504 may be in communication with the processor 502. The receiving circuit 504 may also be configured to receive other information.

The processor 502 may be further configured to send messages, e.g., to the second network node 512, through a sending circuit 505, which may be in communication with the processor 502, and the memory 503.

Those skilled in the art will also appreciate that the any circuit within the first network node 211, e.g., the communication circuit 501 described above, may refer to a combination of analog and digital circuits, and/or one or more processors configured with software and/or firmware, e.g. stored in the memory, that when executed by the one or more processors such as the processor 502, perform actions as described above, in relation to FIG. 3. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

To perform the method action in the second network node 212 described above in relation to FIG. 4 for updating handover procedures to the third network node 213 with the last used PLMN ID in LTE, the second network node 212 comprises the following arrangement depicted in FIG. 6, and as described below. As mentioned above, the second network node 212, and the third network node 213 are configured to operate in the wireless communications network 200. The detailed description of some of the following corresponds to the same references provided above, in relation to the action described for the second network node 212, and will thus not be repeated here.

The second network node 212 is further configured to, e.g., by means of an updating circuit 601 configured to, update the handover procedures with the last used PLMN ID in LTE of the wireless device 230 configured to operate in the wireless communications network 200, the last used PLMN ID in LTE having been provided by the first network node 211 to the second network node 212 as soon as the CS call due to the CSFB, procedure has been setup. The first network node 211 is configured to operate in the wireless communications network 200. Providing of the PLMN ID is configured to have been performed by the first network node 211 by one of: a) adding information about the last used PLMN ID in LTE to an existing message from the first network node 211 to the second network node 212, and b) defining a new message from the first network node 211 to the second network node 212, the new message comprising the last used PLMN ID in LTE.

The updating circuit 601, which may be also referred to a communication module 501 may be a processor 602 of the second network node 212.

In some embodiments, the updating comprises that the last used PLMN ID is added to a HANDOVER REQUIRED message, wherein the information is added to one out of: "Old BSS to new BSS transparent information" and "Source RNC to target RNC transparent information.

This may also be implemented by the updating circuit 601.

Figure 6:
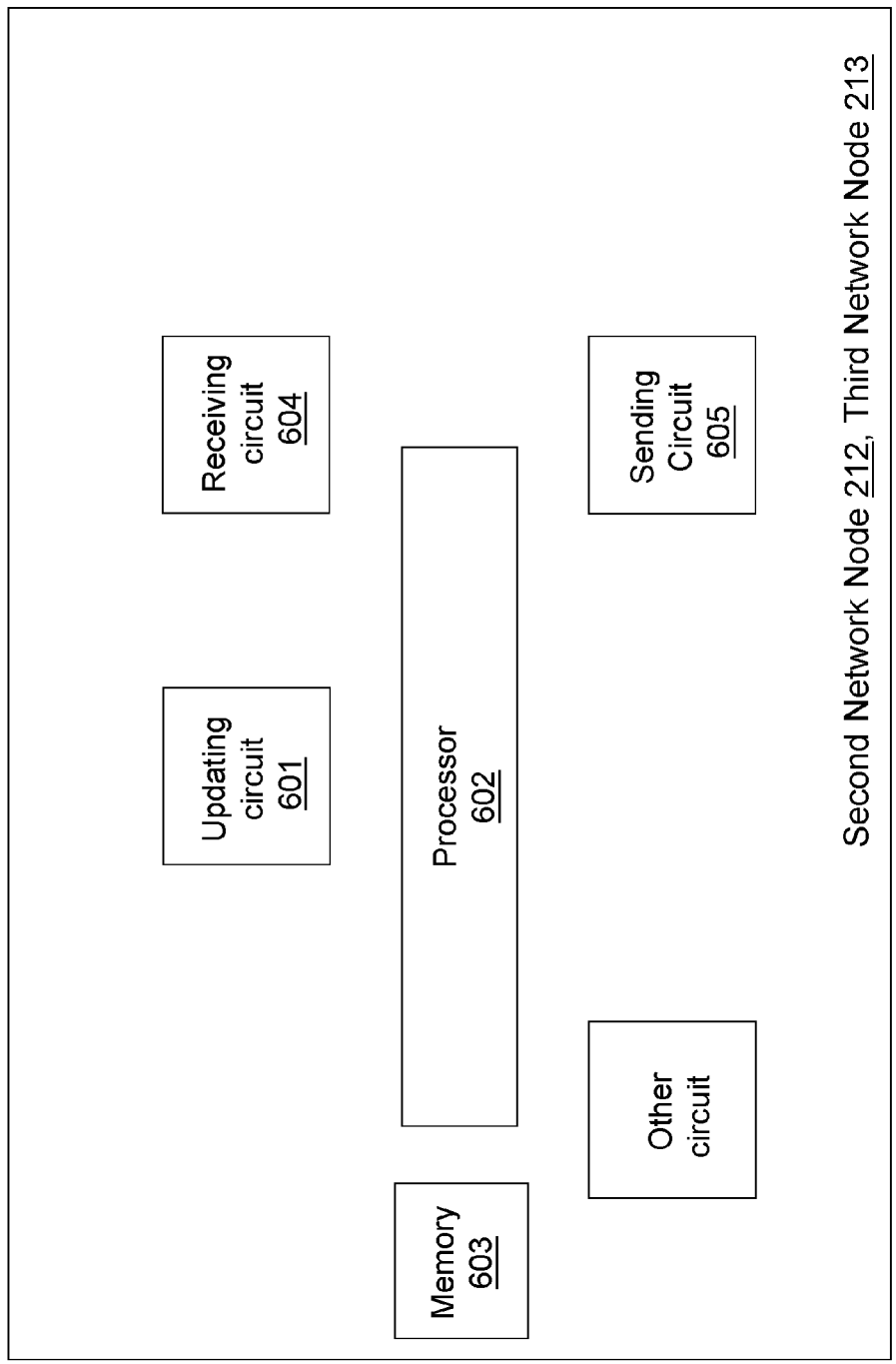
FIG. 6 is a schematic block diagram illustrating embodiments of the second network node and the third network node.

The embodiments herein for updating handover procedures to the third network node 213 with the last used PLMN ID in LTE may be implemented through one or more processors, such as the processor 602 in the second network node 212 depicted in FIG. 6, together with computer program code for performing the functions and actions of the embodiments herein. The program code mentioned above may also be provided as a computer program product, for instance in the form of a data carrier carrying computer program code for performing the embodiments herein when being loaded into the in the second network node 212. One such carrier may be in the form of a CD ROM disc. It is however feasible with other data carriers such as a memory stick. The computer program code may furthermore be provided as pure program code on a server and downloaded to the second network node 212. As indicated above, the processor 602 may comprise one or more circuits, which may also be referred to as one or more modules in some embodiments, each configured to perform the actions carried out by the second network node 212, as described above in reference to FIG. 4, e.g., the updating circuit 601, etc. . . . . Hence, in some embodiments, the updating circuit 601 described above may be implemented as one or more applications running on one or more processors such as the processor 602. That is, the methods according to the embodiments described herein for the second network node 212 are respectively implemented by means of a computer program product, comprising instructions, i.e., software code portions, which, when executed on at least one processor, cause the at least one processor to carry out the actions described herein, as performed by the second network node 212. The computer program product may be stored on a computer-readable storage medium. The computer-readable storage medium, having stored thereon the computer program, may comprise instructions which, when executed on at least one processor, cause the at least one processor to carry out the actions described herein, as performed by the second network node 212. In some embodiments, the computer-readable storage medium may be a non-transitory computer-readable storage medium, such as a CD ROM disc, or a memory stick. In other embodiments, the computer program product may be stored on a carrier containing the computer program of the previous claim, wherein the carrier is one of an electronic signal, optical signal, radio signal, or the computer-readable storage medium, as described above.

The second network node 212 may further comprise a memory 603 comprising one or more memory units. The memory 603 may be arranged to be used to store obtained information, such as the information received by the processor 602, store data configurations, schedulings, and applications etc. to perform the methods herein when being executed in the second network node 212. Memory 603 may be in communication with the processor 602. Any of the other information processed by the processor 602 may also be stored in the memory 603.

In some embodiments, information e.g., from the wireless device 230, and/or the first network node 211, and/or the third network node 213, may be received through a receiving circuit 604. The receiving circuit 604 may be in communication with the processor 602. The receiving circuit 604 may also be configured to receive other information.

The processor 602 may be further configured to send messages, e.g., to the third network node 513, through a sending circuit 605, which may be in communication with the processor 602, and the memory 603.

Those skilled in the art will also appreciate that the any circuit within the second network node 212, e.g., the updating circuit 601 described above, may refer to a combination of analog and digital circuits, and/or one or more processors configured with software and/or firmware, e.g. stored in the memory, that when executed by the one or more processors such as the processor 602, perform actions as described above, in relation to FIG. 4. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

As indicated in FIG. 6, the third network node 213 may have a similar configuration to that of the second network node 212.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope.

The invention claimed is:

1. A method performed by a first network node of providing a last used Public Land Mobile Network Identifier, PLMN ID, in Long Term Evolution, LTE, to a second network node, the first network node and the second network node operating in a wireless communications network, the method comprising:
    providing the last used PLMN ID in LTE of a wireless device in the wireless communications network, to the second network node, as soon as a Circuit Switched, CS, call due to a CS Fall Back, CSFB, procedure has been setup, wherein the second network node is operating in a radio access network (RAN) configured to, after release of the CS call, facilitate re-directing the wireless device to one or more frequencies providing radio coverage to the wireless device according to measurements that the wireless device provides to the RAN during the CS call, the one or more frequencies associated with the last used PLMN ID in LTE, and wherein the providing of the PLMN ID is performed by one of:
        adding information about the last used PLMN ID in LTE to an existing message from the first network node to the second network node,
        defining a new message from the first network node to the second network node, the new message comprising the last used PLMN ID in LTE; and
    wherein the last used PLMN ID is available to the second network node at inter radio access network mobility from the second network node to a third network node, wherein the providing the last used PLMN ID in LTE is performed by adding information to an existing HANDOVER REQUEST message or an existing RELOCATION REQUEST message.

2. The method of claim 1, wherein adding the information about the last used PLMN ID further comprises adding a list of higher priority PLMNs to the existing message, and wherein the new message further comprises the list of higher priority PLMNs.

3. The method of claim 1, wherein the existing message is one out of: a COMMON ID message, a User Equipment, UE, SPECIFIC INFORMATION INDICATION message, and a Radio Access Bearer, RAB, ASSIGNMENT REQUEST message.

4. The method of claim 1, wherein the last used PLMN ID is available to the second network node at inter radio access network mobility from the second network node to a third network node, and the last used PLMN ID is added to a handover preparation phase by updating handover procedures from the second network node to the third network node.

5. A non-transitory computer-readable storage medium comprising a computer program, the computer program comprising instructions which, when executed on at least one processor, cause the at least one processor to carry out the method of claim 1 performed by the first network node.

6. A method performed by a second network node of updating handover procedures to a third network node with a last used Public Land Mobile Network Identifier, PLMN ID, in Long Term Evolution, LTE, the second network node, and the third network node operating in a wireless communications network, the method comprising:
    updating the handover procedures with the last used PLMN ID in LTE of a wireless device in the wireless communications network, the last used PLMN ID in LTE having been provided by a first network node to the second network node as soon as a Circuit Switched, CS, call due to a CS Fall Back, CSFB, procedure has been setup; wherein the updating comprises that the last used PLMN ID is added to a HANDOVER REQUIRED message, wherein the PLMN ID is added to one out of: "Old Base Station Subsystem, BSS, to new BSS transparent information" and "Source Radio Network Controller, RNC, to target RNC transparent information"; the first network node operating in the wireless communications network, and which providing of the PLMN ID has been performed by the first network node by one of:
        adding information about the last used PLMN ID in LTE to an existing message from the first network node to the second network node, and
        defining a new message from the first network node to the second network node, the new message comprising the last used PLMN ID in LTE; and
    performing the handover procedures to the third network node, wherein the third network node is operating in a radio access network (RAN) configured to, after release of the CS call, facilitate re-directing the wireless device to one or more frequencies providing radio coverage to the wireless device according to measurements that the wireless device provides to the RAN during the CS call, the one or more frequencies associated with the last used PLMN ID in LTE.

7. A non-transitory computer-readable storage medium comprising a computer program, the computer program comprising instructions which, when executed on at least one processor, cause the at least one processor to carry out the method of claim 6 performed by the second network node.

8. A first network node for providing a last used Public Land Mobile Network Identifier, PLMN ID, in Long Term Evolution, LTE, to a second network node, the first network node and the second network node being configured to operate in a wireless communications network, the first network node comprising:
  a processor configured to prepare a message indicating the last used PLMN ID in LTE of a wireless device in the wireless communications network, wherein the processor is configured to prepare the message by performing one of:
    adding information about the last used PLMN ID in LTE to an existing message from the first network node to the second network node and adding a list of higher priority PLMNs to the existing message; and
    defining a new message from the first network node to the second network node, the new message comprising the last used PLMN ID in LTE, wherein the new message further comprises the list of higher priority PLMNs; and
  a communication circuit configured to:
    receive, from the processor, the message indicating the last used PLMN ID in LTE; and
    provide the message indicating the last used PLMN ID in LTE to the second network node, as soon as a Circuit Switched, CS, call due to a CS Fall Back, CSFB, procedure has been setup, wherein the second network node is operating in a radio access network (RAN) configured to, after release of the CS call, facilitate re-directing the wireless device to one or more frequencies providing radio coverage to the wireless device according to measurements that the wireless device provides to the RAN during the CS call, the one or more frequencies associated with the last used PLMN ID in LTE.

9. The first network node of claim 8, wherein the existing message is one out of: a COMMON ID message, a User Equipment, UE, SPECIFIC INFORMATION INDICATION message, and a Radio Access Bearer, RAB, ASSIGNMENT REQUEST message.

10. The first network node of claim 8, wherein the last used PLMN ID is available to the second network node at inter radio access network mobility from the second network node to a third network node, and the last used PLMN ID is added to a handover preparation phase by updating handover procedures from the second network node to the third network node.

11. The first network node of claim 8, wherein the last used PLMN ID is available to the second network node at inter radio access network mobility from the second network node to a third network node, wherein the providing (301) the last used PLMN ID in LTE is performed by adding information to an existing HANDOVER REQUEST message-or an existing RELOCATION REQUEST message.

12. A second network node for updating handover procedures to a third network node with a last used Public Land Mobile Network Identifier, PLMN ID, in Long Term Evolution, LIE, the second network node, and the third network node being configured to operate in a wireless communications network, the second network node comprising:
  an updating circuit configured to update the handover procedures with the last used PLMN ID in LTE of a wireless device configured to operate in the wireless communications network, the last used PLMN ID in LTE having been provided by a first network node to the second network node as soon as a Circuit Switched, CS, call due to a CS Fall Back, CSFB, procedure has been setup, the first network node being configured to operate in the wireless communications network, and which providing of the PLMN ID is configured to have been performed by the first network node by one of:
    adding information about the last used PLMN ID in LTE to an existing message from the first network node to the second network node, and
    defining a new message from the first network node to the second network node, the new message comprising the last used PLMN ID in LTE;
  wherein the updating comprises that the last used PLMN ID is added to a HANDOVER REQUIRED message, wherein the information is added to one out of: "Old Base Station Subsystem, BSS, to new BSS transparent information" and "Source Radio Network Controller, RNC, to target RNC transparent information"; and
  a processor configured to perform the handover procedures to the third network node, wherein the third network node is operating in a radio access network (RAN) configured to, after release of the CS call, facilitate re-directing the wireless device to one or more frequencies providing radio coverage to the wireless device according to measurements that the wireless device provides to the RAN during the CS call, the one or more frequencies associated with the last used PLMN ID in LTE.

* * * * *